(12) United States Patent
Masuki (10) Patent No.: US 7,933,511 B2
(45) Date of Patent: Apr. 26, 2011

(54) LENS BARREL AND IMAGE PICKUP APPARATUS

(75) Inventor: Akihiko Masuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/705,334

(22) Filed: Feb. 12, 2010

(65) Prior Publication Data

US 2010/0209088 A1    Aug. 19, 2010

(30) Foreign Application Priority Data

Feb. 16, 2009  (JP) ................... 2009-032863

(51) Int. Cl.
G02B 7/04 (2006.01)
G03B 3/00 (2006.01)

(52) U.S. Cl. ........................................ 396/144; 359/823

(58) Field of Classification Search ............... 396/55, 396/72, 79, 83, 144, 349, 661; 348/208.99, 348/208.4, 208.7, 240.3, 345; 359/557, 683, 359/823

See application file for complete search history.

(56) References Cited

U.S. PATENT DOCUMENTS

| | | | |
|---|---|---|---|
| 6,312,168 B1 * | 11/2001 | Naruse et al. | 396/349 |
| 6,520,691 B2 | 2/2003 | Nomura et al. | |
| 6,851,871 B2 | 2/2005 | Masuda | |
| RE39,752 E | 7/2007 | Nomura et al. | |
| 2001/0024573 A1 | 9/2001 | Nomura et al. | |
| 2004/0027476 A1 | 2/2004 | Masuda | |

FOREIGN PATENT DOCUMENTS

| | | |
|---|---|---|
| JP | 2001-215562 | 8/2001 |
| JP | 2004-069991 | 3/2004 |

* cited by examiner

*Primary Examiner* — Clayton E Laballe
*Assistant Examiner* — Autumn Parker
(74) *Attorney, Agent, or Firm* — Cowan, Liebowitz & Latman, P.C.

(57) ABSTRACT

A lens barrel capable of reducing the radial size thereof while maintaining the degree of freedom in layout of a shutter and a anti-shake mechanism. A barrier drive ring includes first and second rotation-transmitting protrusions axially protruding toward an imaging area and parallel to and substantially opposed to each other. An image pickup element-holding member includes a first and second cam contact section which are brought into contact with the first and second rotation-transmitting protrusion, when the lens barrel is retracted. Rotation transmission to the barrier drive ring is performed in a varying manner first via a contact between the first rotation-transmitting protrusion and first cam contact section, then via contacts between the first and second rotation-transmitting protrusions and the first and second cam contact sections, and finally via a contact between the second rotation-transmitting protrusion and the second cam contact section.

3 Claims, 11 Drawing Sheets

LENS BARREL AND IMAGE PICKUP APPARATUS

BACKGROUND OF THE INVENTION

1. Field of the Invention

The present invention relates to a lens barrel that is provided on an image pickup apparatus (optical apparatus) such as a camera, and the image pickup apparatus that is provided with the lens barrel.

2. Description of the Related Art

Conventionally, a film camera using a silver salt film, and a digital camera capable of shooting using an image pickup element have been known and have been widely used. Recently, for improvement of portability or like purposes, the internal mechanism of a camera has been technically developed so as to reduce the size thereof or increase the change ratio of the focal length (zoom ratio) thereof, and as a result, various techniques have been proposed.

In general, cameras include a zoom camera in which the focal length of a photographic lens is changeable, and a single focus camera in which the focal length is fixed. In theses cameras, there is generally provided a lens barrel which is capable of protruding and retracting the photographic lens, so as to enable size reduction during non-shooting time (when the power of the camera is off) or change in the focal length during shooting time (when the power of the camera is on).

Recently, to realize handy portability of cameras, there has been proposed various mechanisms focusing on the reduction of the size of a camera. To reduce the size of a camera, not only size reduction of a battery, a liquid crystal display device or the like provided in the camera, but also size reduction of a lens barrel is an important factor.

The size reduction of the lens barrel includes two kinds, such as reduction of the size in a direction of the optical axis, which is necessary for reducing the thickness of the camera, and reduction of the size in a radial direction, which is necessary for reducing the vertical and horizontal sizes of the camera. While such a size reduction is in progress, there has recently been dramatically increasing the number of cameras equipped with the anti-shake function, and accordingly, there have been proposed technical contrivances to make the anti-shake function compatible with a driving mechanism for opening and closing barriers conventionally provided in the lens barrel.

Figure 12:
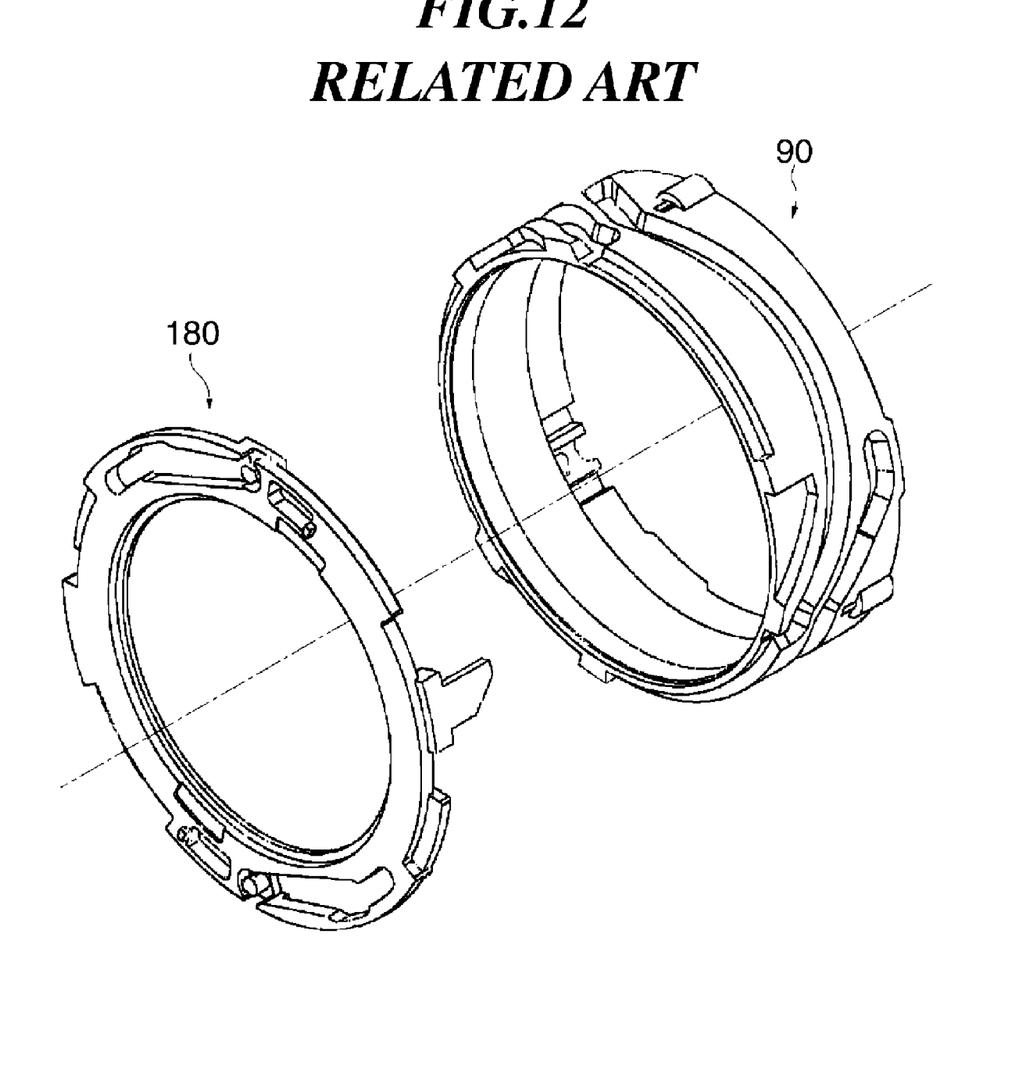
FIG. 12 is an exploded perspective view of a barrier opening/closing mechanism of a conventional image pickup apparatus.

For example, Japanese Patent Laid-Open Publication No. 2001-215562 discloses a technique in which the opening and closing of the barriers is performed by providing a rotation interlocking section interlocked with the barriers, in a movable cam ring disposed at a location radially outward of a lens holding frame equipped with the shutter and a anti-shake mechanism (FIG. 12 attached hereto). In FIG. 12, a reference numeral 180 indicates a barrier drive ring, and a reference numeral 90 indicates a second cam ring.

Figure 13:
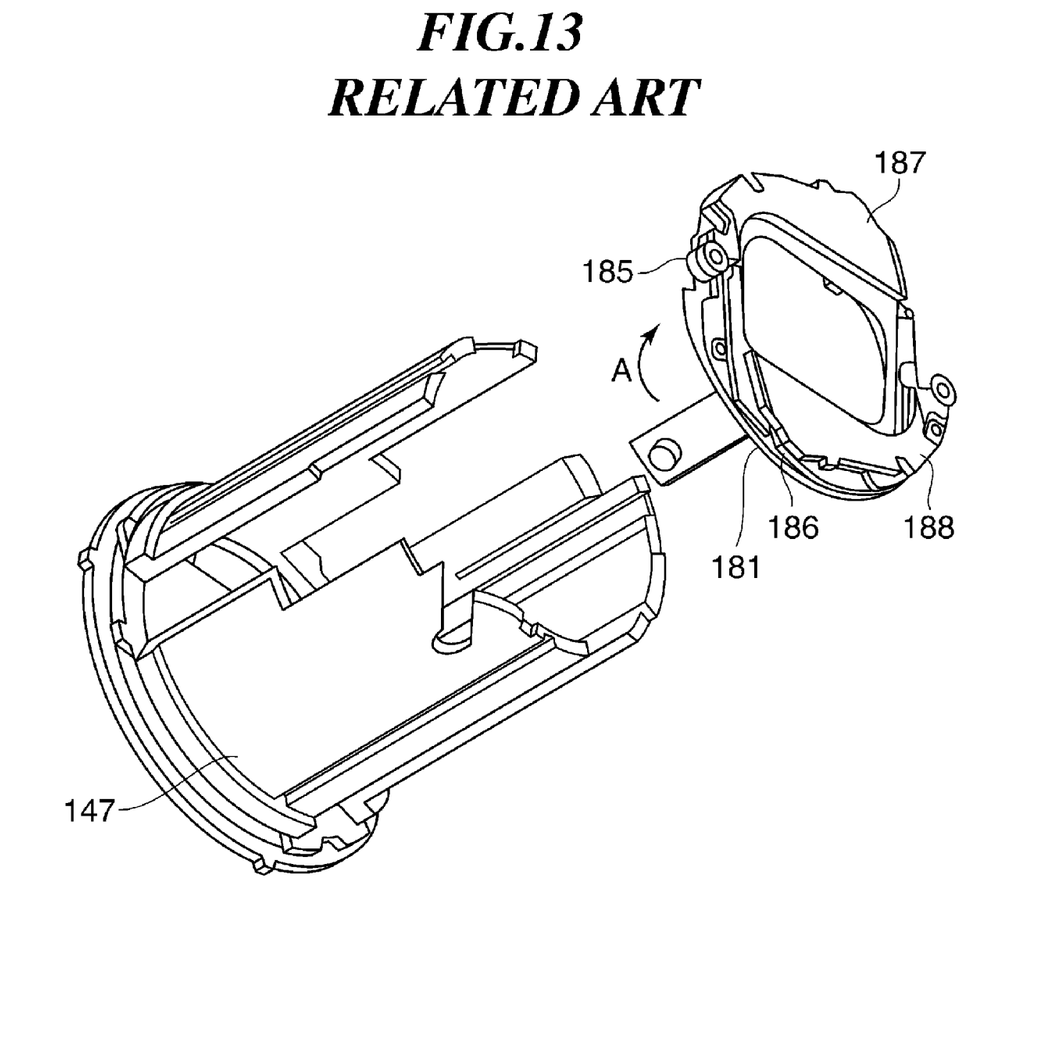
FIG. 13 is an exploded perspective view of a barrier opening/closing mechanism of another conventional image pickup apparatus.

Further, Japanese Patent Laid-Open Publication No. 2004-69991 discloses a technique in which the opening and closing of the barriers is usually performed by providing a rotation interlocking cam interlocked with the barriers, in rectilinear motion barrel disposed at a location radially outward of a lens holding frame equipped with the shutter and the anti-shake mechanism (see FIG. 13 attached hereto). In FIG. 13, a reference numeral 147 indicates a lens barrel component, a reference numeral 181 a driving member, and reference numerals 185 to 188 barrier members.

Further, as a technique for opening and closing the barriers, there has conventionally been proposed a mechanism in which the rotation interlocking section for opening and closing the barriers is protruded from a holding member of an image pickup element toward an object side, and the barriers are brought into contact with the rotation interlocking section, whereby the barriers are driven.

However, in the techniques disclosed in Japanese Patent Laid-Open Publication No. 2001-215562 and No. 2004-69991, it is required to interlock the rotation at a location radially outward of the lens frame equipped with the shutter and anti-shake mechanism, and hence it is necessary to increase the diameter of the barrier drive ring to the outer diameter of the lens frame, which is one factor causing an increase in the radial size of the lens barrel.

Further, in the mechanism in which the rotation interlocking section for opening and closing the barriers is protruded from the holding member of the image pickup element, it is possible to cause the rotation interlocking section to extend through the lens holding frame equipped with the shutter and anti-shake mechanism, in order to reduce the radial size of the lens barrel. However, it is difficult to arrange an extending-through portion of the rotation interlocking section in a construction including the shutter and the anti-shake mechanism.

SUMMARY OF THE INVENTION

The present invention provides a lens barrel and an image pickup apparatus which are capable of reducing the radial size thereof while maintaining the degree of freedom in layout of a shutter and a anti-shake mechanism.

In a first aspect of the present invention, there is provided a lens barrel comprising a barrier drive ring that includes a first rotation-transmitting protrusion which protrudes in a direction of an optical axis toward an imaging area, and a second rotation-transmitting protrusion which is formed at a location parallel to the first rotation-transmitting protrusion and substantially opposed to the first rotation-transmitting protrusion across the optical axis, and an image pickup element-holding member that includes a first cam contact section and a second cam contact section which are brought into contact with the first rotation-transmitting protrusion and the second rotation-transmitting protrusion, respectively, when the lens barrel is retracted, wherein rotation transmission to the barrier drive ring is performed in a varying manner first via a contact between the first rotation-transmitting protrusion and the first cam contact section, then via the contact between the first rotation-transmitting protrusion and the first cam contact section and a contact between the second rotation-transmitting protrusion and the second cam contact section, and finally via the contact between the second rotation-transmitting protrusion and the second cam contact section.

In a second aspect of the present invention, there is provided an image pickup apparatus including a lens barrel, wherein the lens barrel comprises a barrier drive ring that includes a first rotation-transmitting protrusion which protrudes in a direction of an optical axis toward an imaging area, and a second rotation-transmitting protrusion which is formed at a location parallel to the first rotation-transmitting protrusion and substantially opposed to the first rotation-transmitting protrusion across the optical axis, and an image pickup element-holding member that includes a first cam contact section which is brought into contact with the first rotation-transmitting protrusion, and a second cam contact section which is brought into contact with the second rotation-transmitting protrusion, when the lens barrel is retracted, wherein rotation transmission to the barrier drive ring is performed via a contact between the first rotation-transmitting protrusion and the first cam contact section, then via the contact between the first rotation-transmitting protrusion and the first cam contact section and a contact between the second rotation-transmitting protrusion and the second cam contact section, and finally via the contact between the second rotation-transmitting protrusion and the second cam contact section, in a varying manner.

With the arrangement of the lens barrel according to the present invention, it is possible to reduce the radial size of the lens barrel while maintaining the degree of freedom in layout of the shutter and the anti-shake mechanism.

Further features of the present invention will become apparent from the following description of exemplary embodiments with reference to the attached drawings.

DETAILED DESCRIPTION OF THE EMBODIMENTS

The present invention will now be described in detail below with reference to the accompanying drawings showing embodiments thereof.

Figure 1:
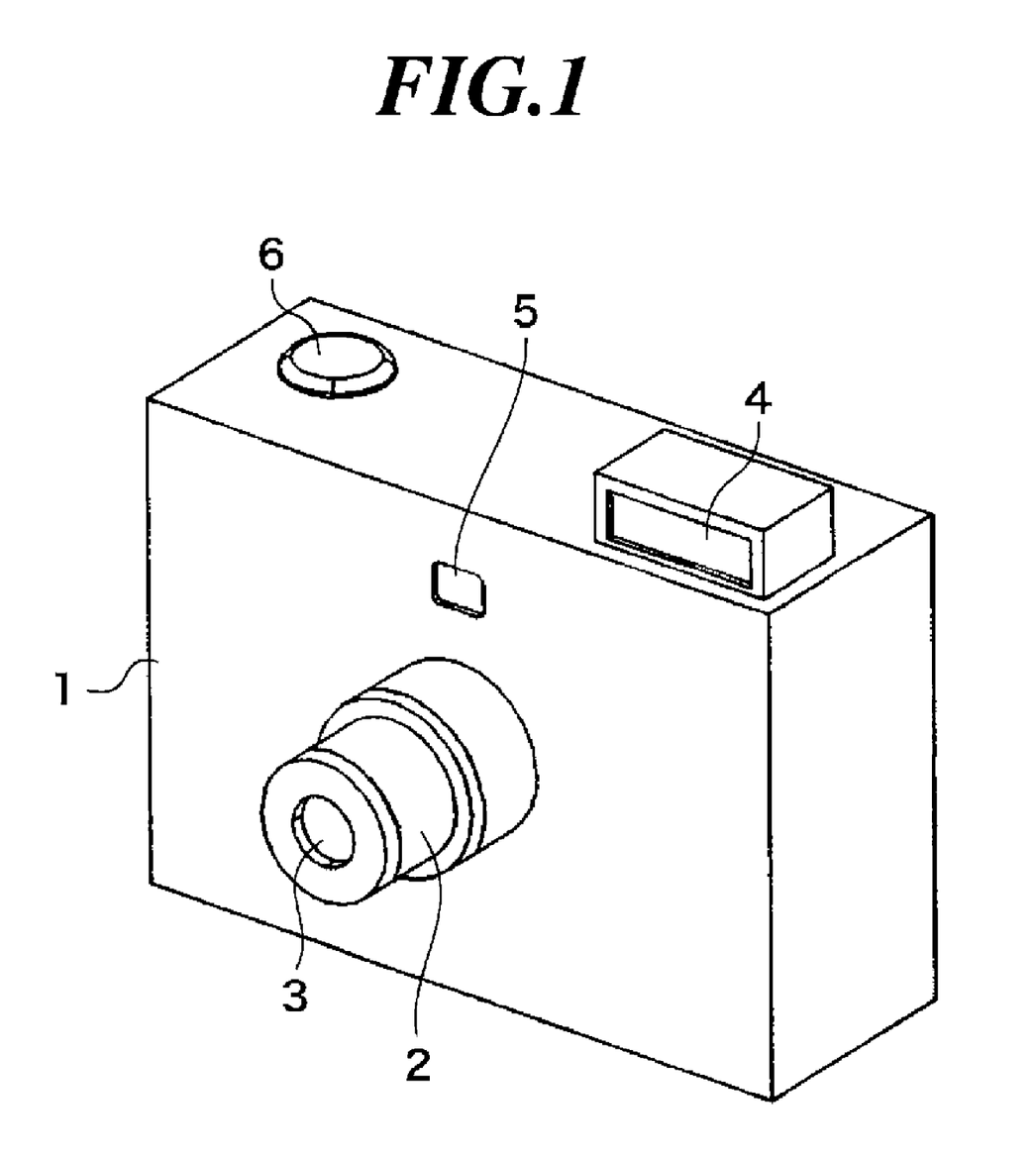
FIG. 1 is a perspective view of an appearance of a camera as an image pickup apparatus according to an embodiment of the present invention.

FIG. 1 is an external perspective view of a camera as an image pickup apparatus according to an embodiment of the present invention.

In FIG. 1, on a front face of a camera body 1, there is provided a lens barrel 2 of which a focus length of a photographic lens is changeable. On a front face of the lens barrel 2, there is provided a lens barrier unit 3 which opens and closes an optical path of the photographic lens according to the ON/OFF operation of the power of the camera.

Further, a flashing window section 4 which comprises a strobe device for emitting flashlight to an object is provided on the top surface of the camera body 1, and a finder window 5 is provided on the front face of the camera body 1.

Further, the top surface of the camera body 1 is provided with a release button 6 for starting a shooting preparation operation (focus adjustment operation and photometric operation) and a shooting operation (exposure to the image pickup element, such as a film or a CCD). It should be noted that FIG. 1 is a schematic view of a typical camera, and the present invention is not limited to the above-described arrangement.

Figure 2:
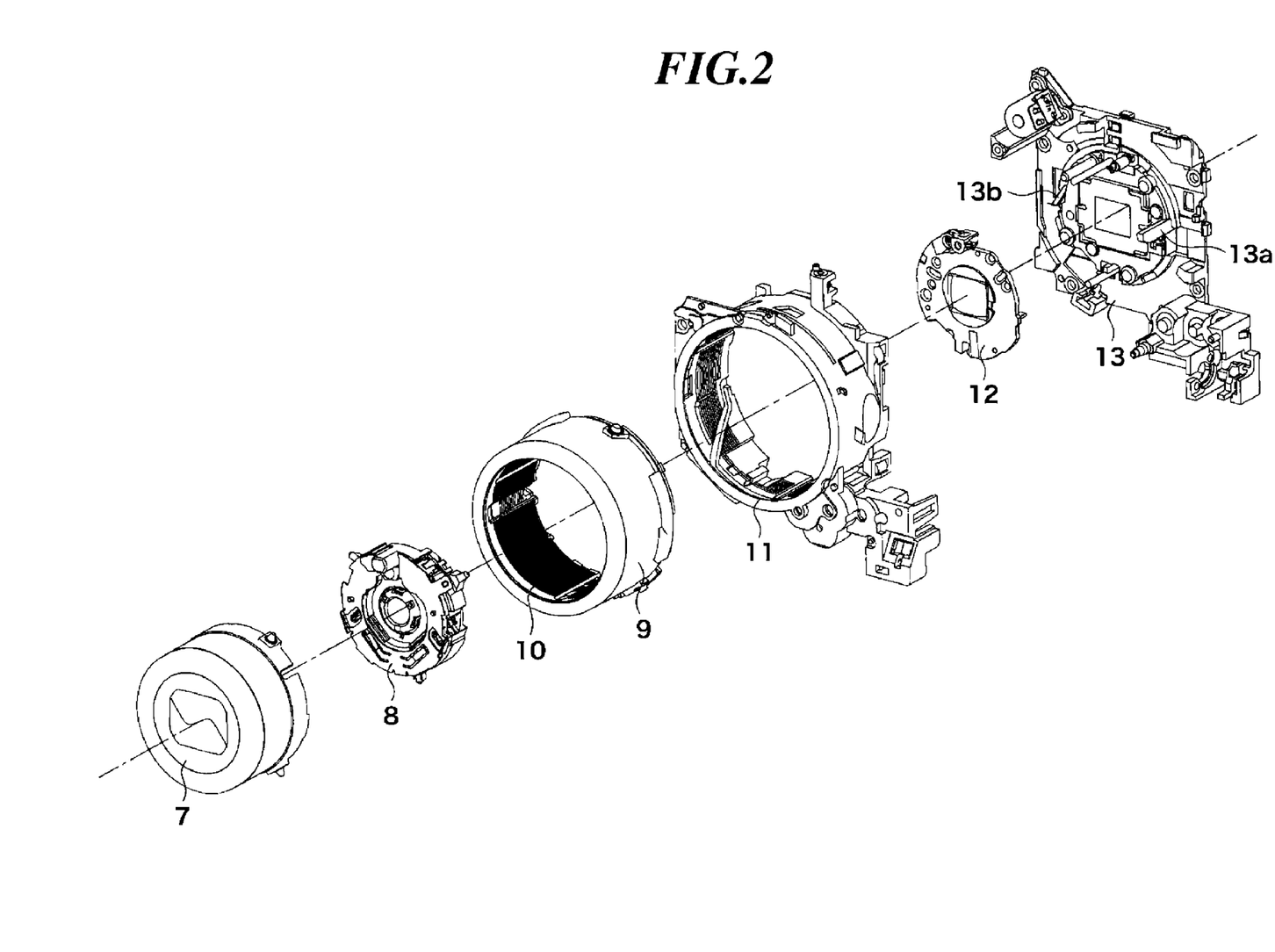
FIG. 2 is an exploded perspective view of a lens barrel appearing in FIG. 1.

FIG. 2 is an exploded perspective view of the lens barrel 2 appearing in FIG. 1.

In FIG. 2, a first group barrel 7 holds a first group photographic lens, and is provided with the above-mentioned lens barrier unit 3. A second group barrel 8 holds a second group photographic lens, and is provided with a anti-shake lens mechanism and a shutter and diaphragm mechanism, referred to hereinafter. A movable cam ring 9 has a driving cam, not shown, provided on an inner periphery thereof for driving the first group barrel 7 and the second group barrel 8, and includes a gear section to which power is transmitted from a lens barrel-driving motor, not shown.

A rectilinear motion barrel 10 is held by the movable cam ring 9 in a rotatable manner, and controls the first group barrel 7 and the second group barrel 8 such that they move linearly, i.e. straight forward or back. A fixed barrel 11 has a driving cam, not shown, provided on an inner periphery thereof with for driving the movable cam ring 9. A third group barrel 12 holds a third group photographic lens.

An image pickup element-holding member 13 is provided with two cam contact sections 13a and 13b which are respectively brought into contact with two rotation-transmitting protrusions 18a and 18b of a barrier drive ring 18, referred to hereinafter.

It should be noted that the arrangement of the lens barrel 2 is not limited to the above-described arrangement, insofar as the arrangement satisfies the features of the present invention.

Figure 3:
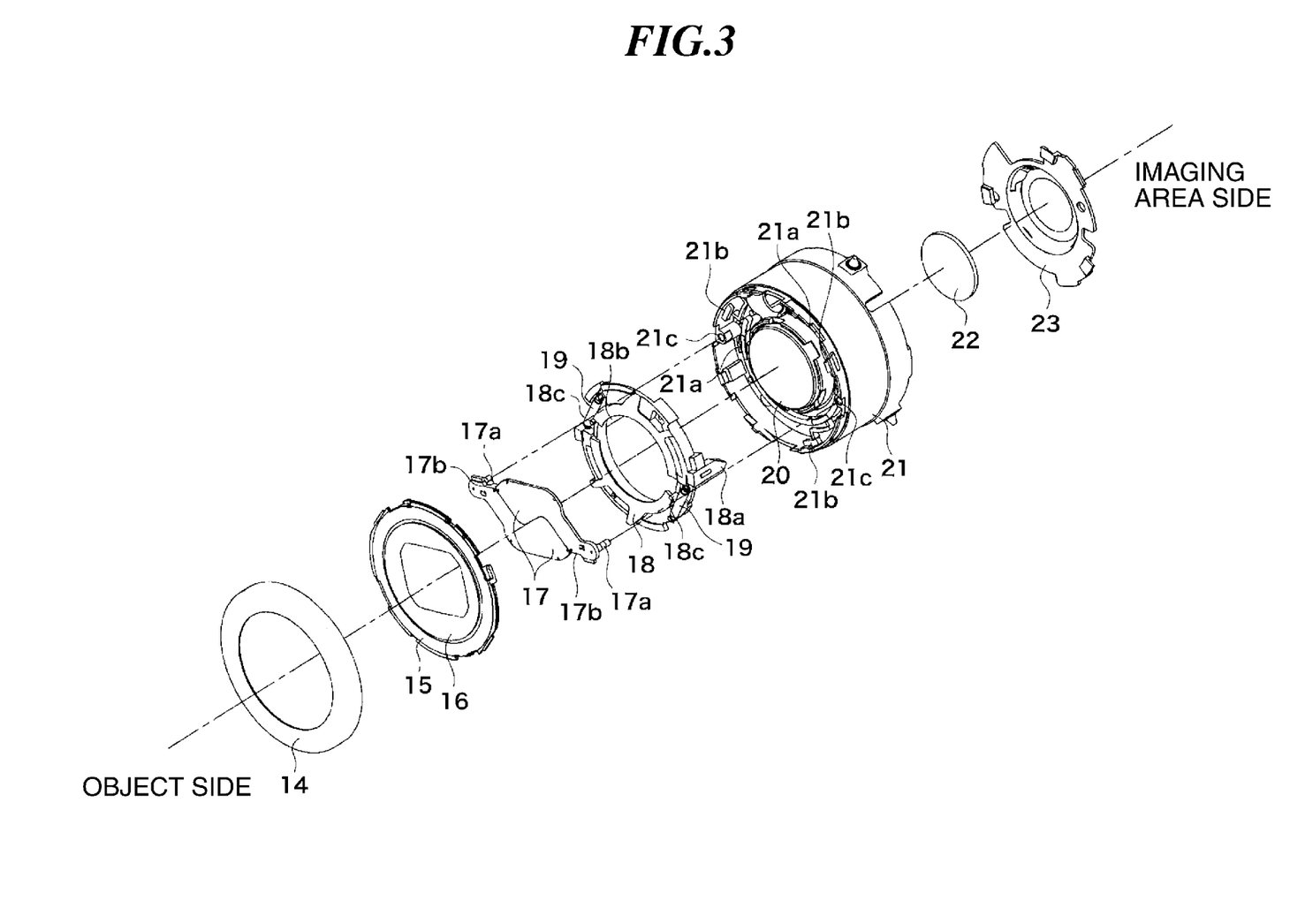
FIG. 3 is an exploded perspective view of a first group barrel appearing in FIG. 2.

FIG. 3 is an exploded perspective view of the first group barrel 7 appearing in FIG. 2.

Next, a description will be given of the arrangement of the first group barrel with reference to FIG. 3.

The first lens barrel 7 includes the barrier mechanism as mentioned above. A lens holder 21 in FIG. 3 has a lens 20 and a lens 22 fixed thereto by adhesive or by thermal swaging, and a fixed diaphragm 23 attached thereto from the imaging area side, for cutting harmful light emitting from the lens 22.

The lens holder 21 has the barrier mechanism provided an object side thereof, such that the barrier covers the lens 20. The barrier drive ring 18 is disposed around the lens 20 in a manner rotatable about the optical axis. The barrier drive ring 18 is received by a receiving surface 21a of the lens holder 21 in a direction of the optical axis, and is slidably rotated by retainers 21b.

A rotary shaft 17a of each of barrier blades 17 is slidably fitted in an associated one of shaft holes 21c of the lens holder 21. Springs 19 are disposed between the barrier drive ring 18 and the barrier blades 17, whereby the springs 19 always urge the barrier blades 17 in a closing direction.

When the lens barrel is retracted, the two cam contact sections 13a and 13b appearing in FIG. 2 are respectively brought into contact with two rotation-transmitting protrusions 18a and 18b formed on the barrier drive ring 18, whereby a state in which the blades are closed is maintained (timing of contact will be described hereinafter).

Here, the rotation-transmitting protrusion 18a forms a first rotation-transmitting protrusion which protrudes toward the imaging area in the direction of the optical axis. Further, the rotation-transmitting protrusion 18b forms a second rotation-transmitting protrusion which is formed at a location substantially opposed to the first rotation-transmitting protrusion across the optical axis such that it extends parallel to the first rotation-transmitting protrusion. It should be noted that the first and second rotation-transmitting protrusions may be reversed.

Further, the cam contact section 13a forms a first cam contact section which is brought into contact with the first rotation-transmitting protrusion when the lens barrel 2 is received in. The cam contact section 13b forms a second cam contact section which is brought into contact with the second rotation-transmitting protrusion when the lens barrel 2 is received in. It should be noted that the first and second cam contact sections may be reversed.

Then, when the power of the camera is turned on, whereby the lens barrel is protruded and the restriction thereon is released, the barrier drive ring 18 is rotated counterclockwise by the spring force, so that protruding portions 18c push contact portions 17b of the barrier blades 17, which causes the barrier blades 17 to be rotated about the rotary shaft 17a, whereby the barrier blades 17 are opened.

The is a cover member 16 provided on the object side of the barrier blades 17, which is fixed to the lens holder 21 by bayonets. Further, a double-faced tape 15 is affixed to the cover member 16 and fixes a cap member 14.

Next, a description will be given of the arrangement of the second group barrel with reference to FIGS. 4, 5, and 6.

Figure 4:
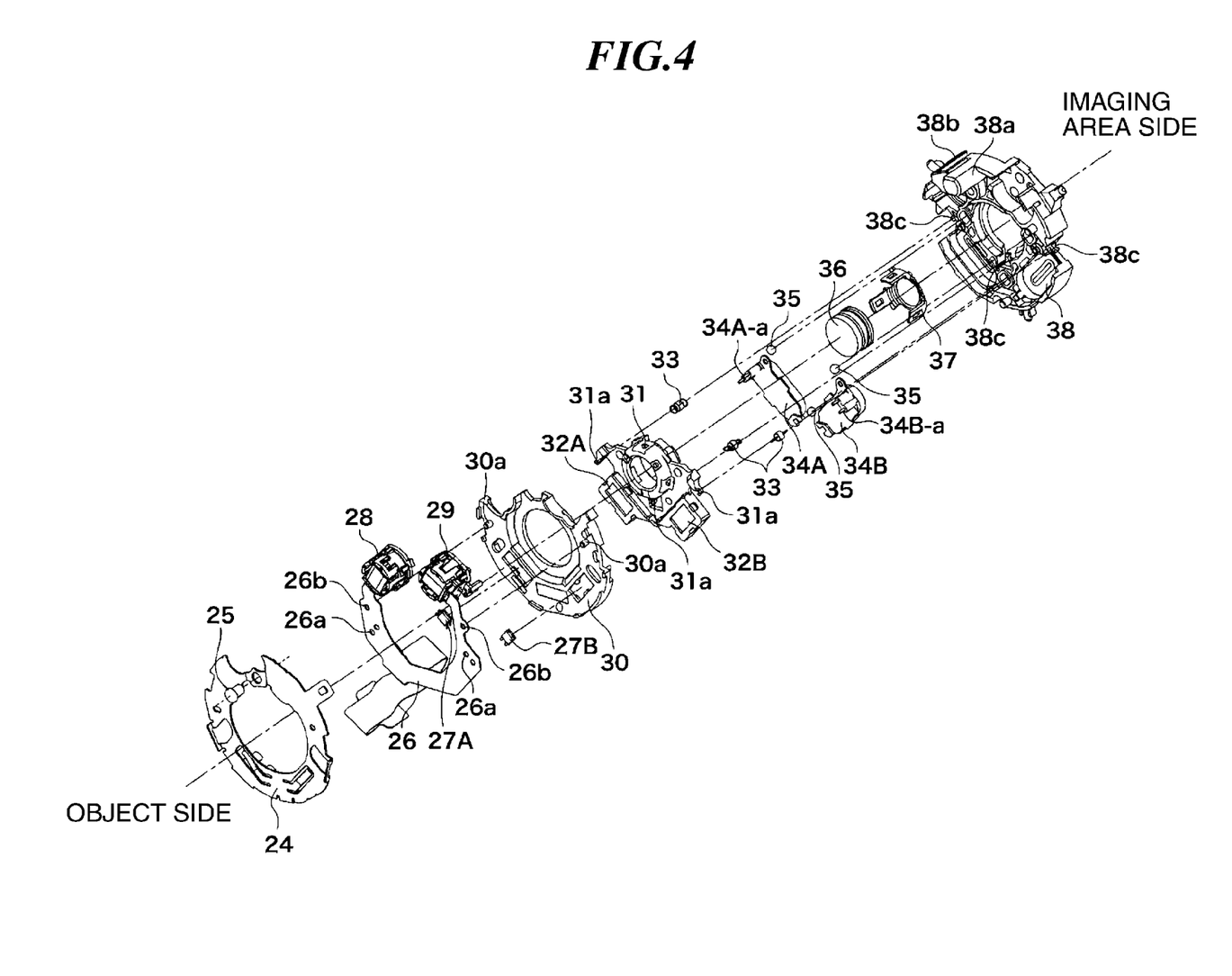
FIG. 4 is an exploded perspective view of a second group barrel appearing in FIG. 2.

FIG. 4 is an exploded perspective view of the second group barrel 8 appearing in FIG. 2. FIG. 5 is a plan view of the second group barrel 8 appearing in FIG. 2 as viewed from the object side, and shows a state in which a sensor holder 30, a second group FPC 26, and a second group cover 24 are removed for purposes of illustration.

The second group barrel 8 includes the anti-shake mechanism and the shutter and diaphragm mechanism, as mentioned above. In FIG. 4, a base member 38 is a base of the second group barrel 8. The base member 38 is formed with a clearance shape portion 38a for a focus feeding screw, not shown, and a clearance shape portion 38b for a focus guide bar, not shown.

Although the lens barrel 2 reduces the size thereof by reducing the spaces between the lens groups when the lens barrel is retracted, the focus feeding screw and the focus guide bar protrude in the direction of the optical axis, and hence the focus feed screw and the focus guide bar extend through the base member 38 when the lens barrel is retracted. Then, a ray of light which does not pass through the lenses passes through portions where the focus feed screw and the focus guide bar extend through, and enters the CCD (image pickup element), causing leakage of the ray of light. Therefore, the clearance shape portions 38a and 38b are formed into a bag-shape to prevent leakage of the ray of light as much as possible.

A second group lens 36 is swaged to a second group lens holder 31. Magnets 32A and 32B are integrally held in the second group lens holder 31.

Figure 5:
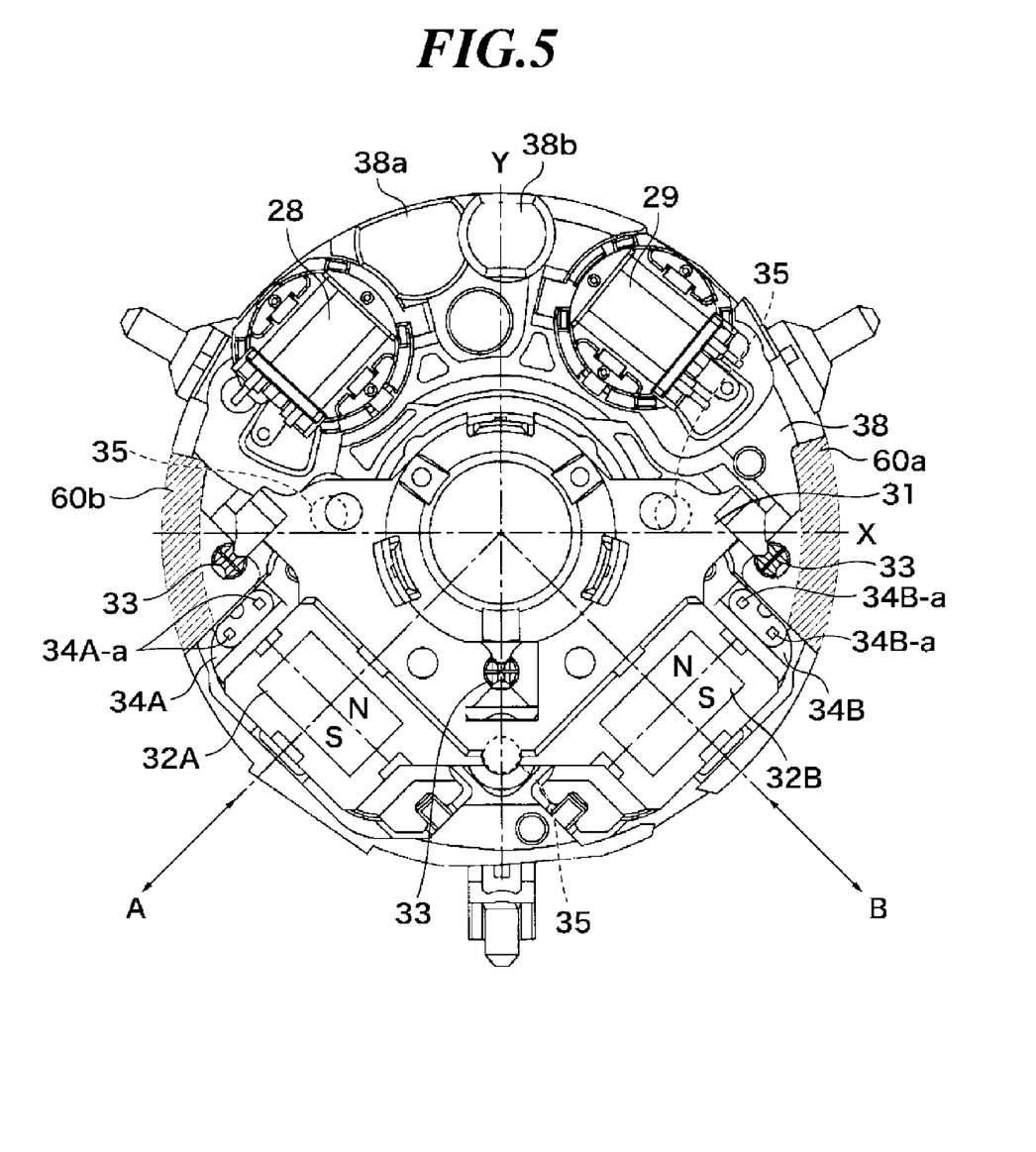
FIG. 5 is a plan view of the second group barrel appearing in FIG. 2 as viewed from an object side.

Suffixes A and B in the reference numerals in FIG. 4 are associated with directions A and B illustrated in FIG. 5.

The second group lens holder 31 has three hooks 31a on which tension springs 33 are hooked. A fixed diaphragm 37 for cutting harmful light is fixed to the second group lens holder 31 by the hooks 31a.

Coil units 34A and 34B each comprised of a coil and a bobbin are fixed by adhesive to respective recesses in the base member 38.

Power feed to the coils is performed using the second group FPC 26 by feeding power to metallic pins 34A-a and 34B-a which are embedded in the bobbins and are electrically connected to the coils, respectively.

The other end of each tension spring 33 hooked on the second group lens holder 31 is hooked on an associated one of hooks 38c of the base member 38, and three nonmagnetic balls 35 are sandwiched between the base member 38 and the second group lens holder 31, so that the second group lens holder 31 is urged toward the base member 38 with the nonmagnetic balls 35 interposed therebetween.

However, thanks to the interposition of the nonmagnetic balls 35, the second group lens holder 31 is capable of freely moving within a plane perpendicular to the optical axis. By moving the second group lens holder 31 within the plane, an image on the CCD is controlled and the anti-shake operation is performed.

Next, both of a shutter actuator 28 for actuating shutter blades and an ND actuator 29 for actuating an ND filter are of a two-point switching type in which a stop position of an arm is switched by switching the energizing direction between normal and reverse.

Here, the magnets 32A and 32B, and the coil units 34A and 34B form a anti-shake driving section which is arranged substantially symmetrically with respect to a plane containing the optical axis.

Further, the shutter actuators 28 and 29 form a shutter driving section which is arranged substantially symmetrically with respect to the above-mentioned plane, and is located on an opposite side of a plane perpendicular to the plane containing the optical axis from the anti-shake driving section.

One end of the second group FPC 26 forms a semi-arc shape. The actuators 28 and 29 are connected to the opposite ends of the semi-arc by soldering, and lands 26a to which the above-mentioned coil pins 34A-a and 34B-a of the coil units 34A and 34B are connected by soldering are provided at intermediate portions of the semi-arc. Further, hall elements 27A and 27B for detecting a magnetic field are mounted on the reverse side of the second group FPC 26.

The magnets 32A and 32B of the second group lens holder 31 are magnetized in directions illustrated in FIG. 5. Each of the hall elements detects the movement of an associated one of the magnets 32A and 32B in the direction A or B as a change in the magnetic field, and calculates an amount of the movement based on the detected amount of the change. Since the accuracy of positions of the magnets 32A and 32B and the hall elements 27A and 27B is significant, the hall elements 27A and 27B are press-fitted into the sensor holder 30, which accurately positions them.

The second group FPC 26 is fixed by positioning holes 26b and positioning dowels 30a of the sensor holder 30, and the sensor holder 30 is mounted on the base member 38. Then, the second group cover 24 is fixed to the base member 38 by a screw 25 and an outer peripheral hook, not shown, whereby the sensor holder 38 and the actuators 28 and 29 are fixed to the base member 38.

Figure 6:
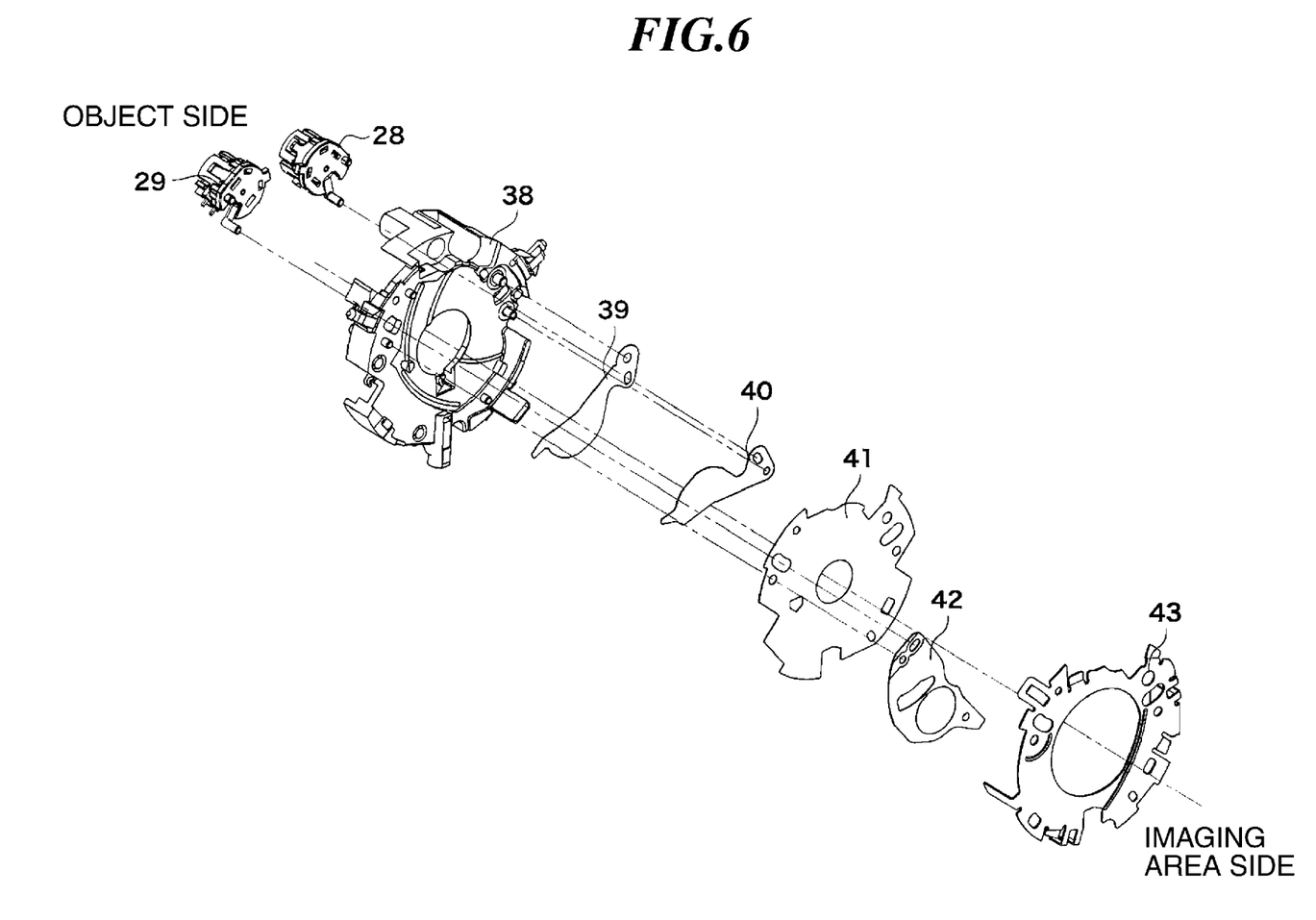
FIG. 6 is an exploded perspective view of the second group barrel appearing in FIG. 2 as viewed from an imaging area side.

FIG. 6 is an exploded perspective view of the second group barrel 8 appearing in FIG. 2 as viewed from the imaging area side.

Detailed description of the component elements in FIG. 6 denoted by the same reference numerals as those described above is omitted. Shutter blades 39 and 40 are actuated by an actuating arm, not shown, of the shutter actuator 28. A partition plate 41 and an ND filter 42 for restricting an amount of light are driven by the ND actuator 29, and they repeat respective motions into or out of the light path. A shutter cover 43 is fixed to the base member 38 by hooks, not shown, to thereby protect the shutter blades 39 and 40, and the ND filter.

Next, a description will be given of the layout within the second group barrel shown in FIG. 5.

The second group barrel 8 is provided with the anti-shake lens mechanism and the shutter and diaphragm mechanism as described above. The magnets 32A and 32B and the coil units 34A and 34B as anti-shake driving members are disposed within the base member 38, in V-shape arrangement symmetrically with respect to a Y-axis in FIG. 5.

Further, the shutter actuator 28 and the ND actuator 29 are also disposed within the base member 38 in V-shape arrangement symmetrically to the Y-axis in FIG. 5, and are located on an opposite side of an X-axis in FIG. 5 from the anti-shake driving members.

It is effective to place the clearance shape portions 38a and 38b for the focus feeding screw and the focus guide bar of the base member 38 in upper positions when the camera is in its normal position, in preventing the harmful light from entering the image pickup element, and hence the clearance shape portions 38a and 38b are disposed between the shutter actuator 28 and the ND actuator 29.

Further, if the arrangements of the tension springs 33 and the nonmagnetic balls 35 for driving the second group lens holder 31 to the XY plane (the nonmagnetic balls 35 are indicated by dot lines, because they are on the reverse side) are included, the whole area of the XY plane on the base member 38 is almost filled by the focus clearance portions, the anti-shake driving members, and the actuators 28 and 29.

Without changing this layout, a through hole 60b, referred to hereinafter, for passing the barrier rotation-transmitting protrusion 18b through is formed in the base member 38 at a location between the shutter actuator 28 and ones (the magnet 32A and the coil unit 34A) of the anti-shake driving members. Similarly, a through hole 60a, referred to hereinafter, for passing the barrier rotation-transmitting protrusion 18a through is formed in the base member 38 at a location between the ND actuator 29 and ones (the magnet 32B and the coil unit 34B) of the anti-shake driving members, substantially symmetrically to the Y-axis.

Figure 7:
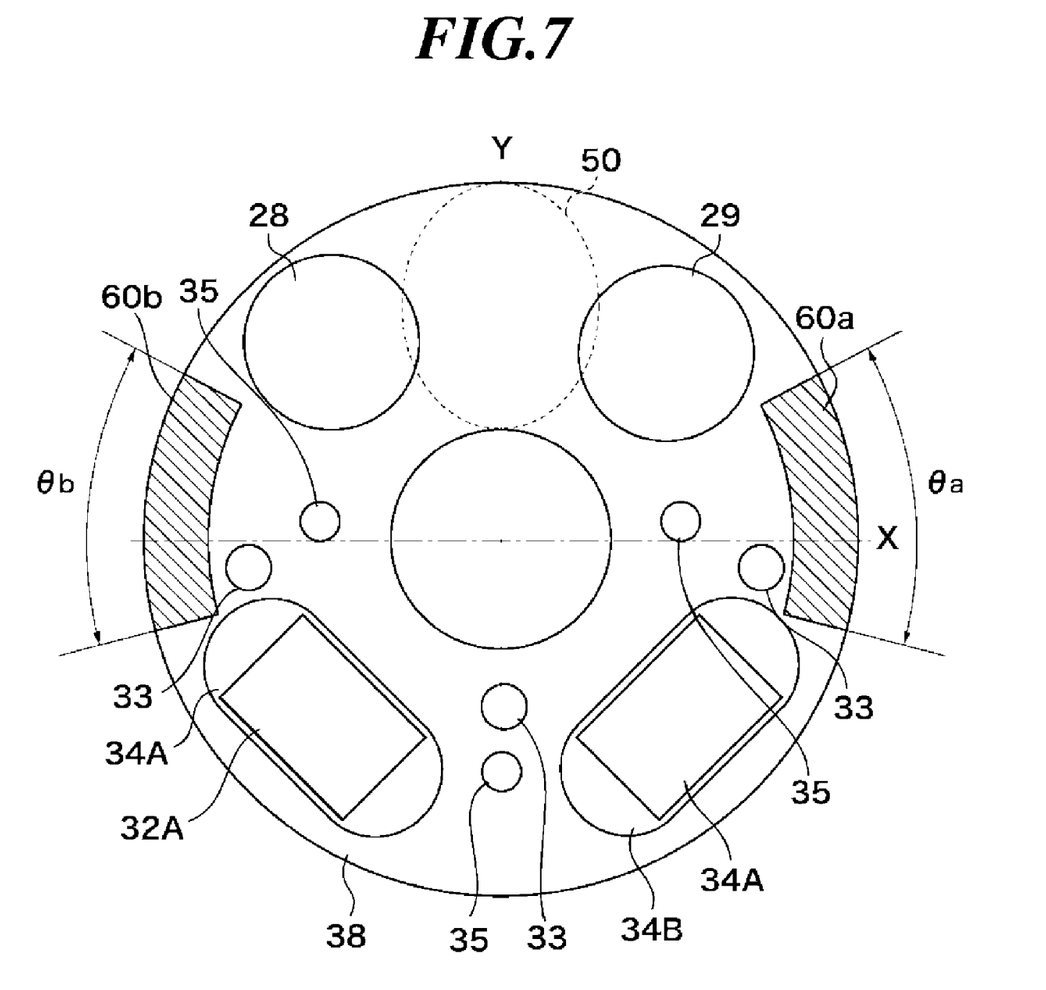
FIG. 7 is a schematic plan view of the second group barrel appearing in FIG. 2.

FIG. 7 is a schematic plan view of the second group barrel 8 appearing in FIG. 2.

The arrangement illustrated in FIG. 7 is identical to that in FIG. 5 except that the clearance shape portions 38a and 38b which are bag-shaped for the focus feeding screw and the focus guide bar of the base member 38 are collectively indicated by a focus clearance portion 50.

To reduce the size of the lens barrel 2 in the radial direction, it is necessary to reduce the diameter of the barrier drive ring 18 so as to make the entire first group barrel small. To this end, it is required to pass the rotation-transmitting protrusion 18a or 18b for transmitting the rotation from the barrier drive ring 18 through the second group barrel 8 containing the anti-shake mechanism and the shutter mechanism.

Figure 8:
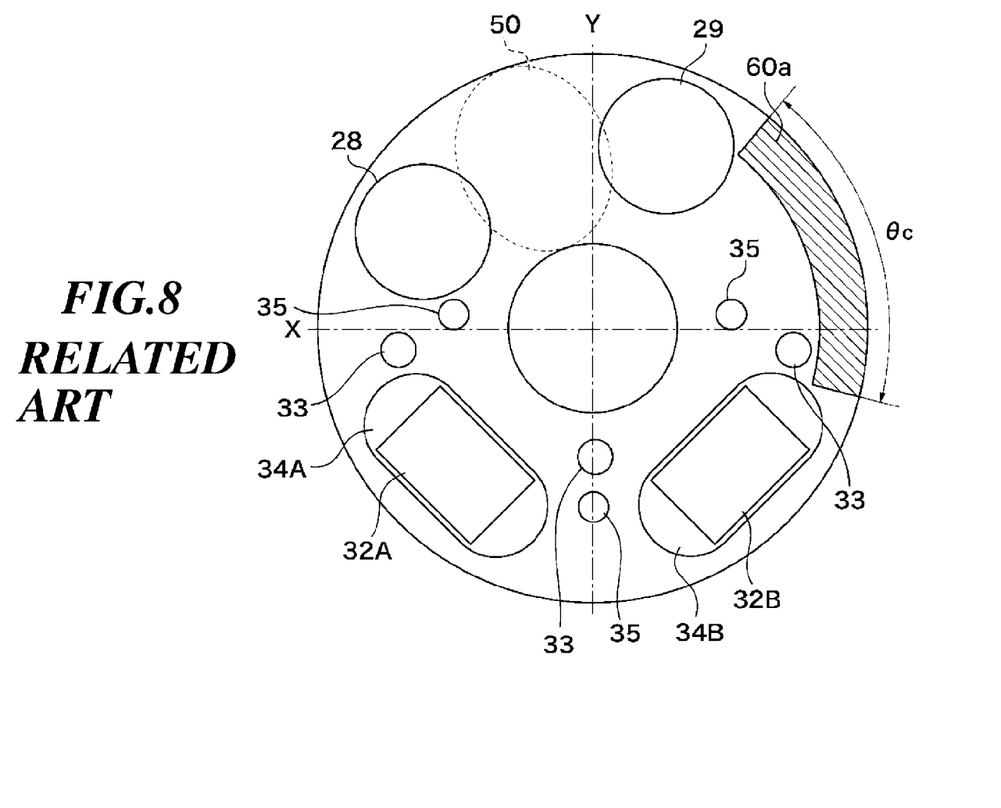
FIG. 8 is a schematic plan view of a conventional second group barrel compared with the second group barrel of the present invention shown in FIG. 7.

FIG. 8 is a schematic plan view of a conventional second group barrel compared with the second group barrel 8 of the present invention shown in FIG. 7. Specifically, FIG. 8 schematically shows how relevant members would be laid out on the second group barrel 8, assuming that the barriers are driven for opening and closing, using the barrier drive ring 18 and the image pickup element-holding member 13, in a conventional manner.

The reference numerals in FIG. 8 are identical to those in FIG. 7. One rotation-transmitting member 18a is protruded from the barrier drive ring 18, and the barrier drive ring 18 is rotated by the cam contact section 13a of the image pickup element-holding member 13, whereby the barriers are opened and closed as described before. The area in which the rotation-transmitting member 18a or the cam contact section 13a extends through the base member 38 is indicated by the through hole 60a.

In this layout, a rotational angle θc of the through hole 60a is large, and hence it is required to rotate an arrangement area where the ND actuator 29, the focus clearance portion 50 and the shutter actuator 28 are disposed counterclockwise.

In this case, however, not only it is impossible to place the focus clearance portion 50 at a top location when the camera is in its normal position, but also it is impossible to satisfy the requirements of layout of the second group barrel 8, because the location of the shutter actuator 28 overlaps the location of the nonmagnetic balls 35 of the anti-shake mechanism and the location of the second group lens holder 31.

For this reason, as shown in FIG. 7, the rotation-transmitting protrusion of the barrier drive ring 18 is divided into the rotation-transmitting protrusions 18a and 18b. Then, areas of the base member 38 wherethrough extend the cam contact sections 13a and 13b of the image pickup element-holding section 13, which are brought into contact with the rotation-transmitting protrusions 18a and 18b, are allocated to the through holes 60a and 60b, whereby it is possible to satisfy the requirements of the anti-shake mechanism and the shutter mechanism of the second group barrel 8.

That is, the layout of the second group barrel 8 does not satisfy the requirements if the rotation angle of one through hole 60a in FIG. 8 is equal to θc. For this reason, as shown in FIG. 7, the through hole is divided into the through hole 60a having a rotational angle θa (first through hole) and the through hole 60b having a rotational angle θb (second through hole), whereby it is possible to form spaces for driving the barriers in the second group barrel 8 (however, θc>θa, θc>θb).

Here, the first and second through holes may be reversed.

Figure 9:
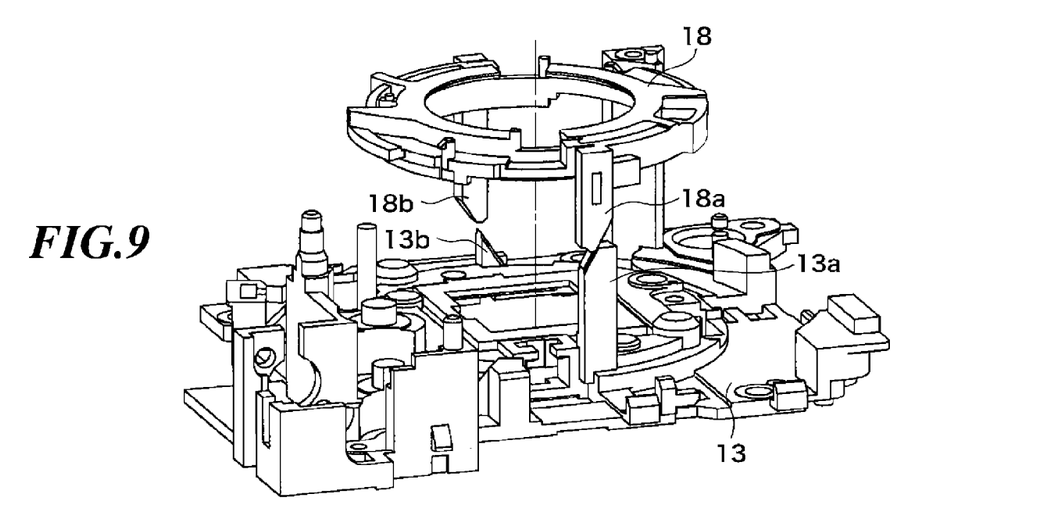
FIG. 9 is a simplified perspective view of one state of a barrier opening/closing mechanism in the lens barrel shown in FIG. 2.
Figure 10:
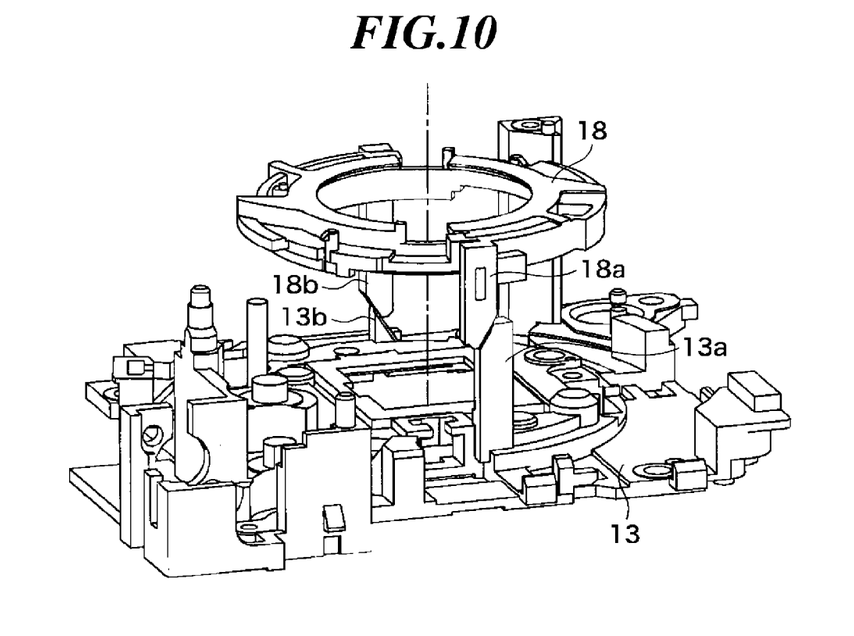
FIG. 10 is a simplified perspective view of another state of the barrier opening/closing mechanism in the lens barrel shown in FIG. 2.
Figure 11:
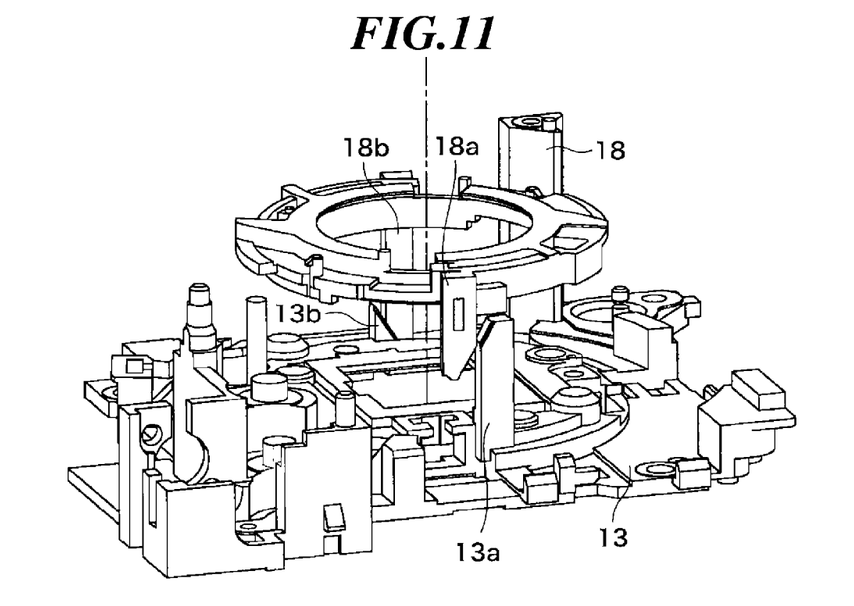
FIG. 11 is a simplified perspective view a still another state of the barrier opening/closing mechanism in the lens barrel shown in FIG. 2.

FIGS. 9 to 11 are simplified perspective views of a barrier opening/closing mechanism in the lens barrel 2 shown in FIG. 2.

Next, a description will be given of timing in which the divided rotation-transmitting protrusions 18a and 18b of the barrier drive ring 18 are brought into contact with the cam contact sections 13a and 13b of the image pickup element-holding section 13.

FIGS. 9 to 11 illustrate only the barrier drive ring 18 and the image pickup element-holding section 13, for clarity.

FIG. 9 illustrates a moment at which the barrier drive ring 18 included in the first group barrel 7 is retracted toward the imaging area, and is brought into contact with the cam contact section 13a of the image pickup element-holding section 13, whereby the rotation thereof is started when the lens barrel 2 is received into the camera body 1.

FIG. 10 illustrates a state in which the lens barrel 2 is further retracted, and the rotation-transmitting protrusion 18b is also brought into contact with the cam contact section 13b in a state in which the rotation-transmitting protrusion 18a of the barrier drive ring 18 is in contact with the cam contact section 13a. FIG. 11 illustrates a state in which the lens barrel 2 is further retracted from the state illustrated in FIG. 10 until it is accommodated in the camera body 1.

When the lens barrel 2 is retracted, as shown in FIG. 9, the rotation-transmitting protrusion 18a of the barrier drive ring 18 is brought into contact only with the cam contact section 13a of the image pickup element-holding section 13, whereby the operation of closing the barriers is started.

At this time, the rotation-transmitting protrusion 18b facing the rotation-transmitting protrusion 18a across the optical axis is not brought into contact with the cam contact section 13b of the image pickup element-holding section 13, so that the barriers are being closed only by the rotational force of the rotation-transmitting protrusion 18a.

When the lens barrel is further retracted, as shown in FIG. 10, the rotation-transmitting protrusion 18b is also brought into contact with the cam contact section 13b, so that the barriers are being closed by both the rotational forces of the rotation-transmitting protrusions 18a and 18b.

When the lens barrel 2 is completely retracted and is placed in an accommodated state as shown in FIG. 11, the contact between the rotation-transmitting protrusion 18a and the cam contact section 13a is released, so that the closed state of the barriers is held only by the contact between the rotation-transmitting protrusion 18b and the cam contact section 13b.

That is, at the timing in which the lens barrel 2 is retracted to start closing the barriers, the barrier drive ring 18 is rotated by one contact between one rotation-transmission protrusion and one cam contact section, then, from halfway, both of the rotation-transmission protrusions come to be in contact with both of the cam contact sections, and finally the contact is switched to the other contact between the other rotation-transmission protrusion and the other cam contact section, which maintains the closed state of the barriers.

As described above, it is possible to reduce each width (in the circumferential direction) of the rotation-transmitting protrusion 18a or 18b by switching the contact timings, and hence the sizes of the through holes 60a and 60b can be also reduced, whereby it is possible to accommodate the necessary component elements in the layout illustrated in FIG. 5.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-032863, filed Feb. 16, 2009, which is hereby incorporated by reference herein in its entirety.

What is claimed is:

1. A lens barrel comprising:
   a barrier drive ring that includes a first rotation-transmitting protrusion which protrudes in a direction of an optical axis toward an imaging area, and a second rotation-transmitting protrusion which is formed at a location parallel to said first rotation-transmitting protrusion and substantially opposed to said first rotation-transmitting protrusion across the optical axis; and
   an image pickup element-holding member that includes a first cam contact section and a second cam contact section which are brought into contact with said first rotation-transmitting protrusion and said second rotation-transmitting protrusion, respectively, when said lens barrel is retracted,
   wherein rotation transmission to said barrier drive ring is performed in a varying manner first via a contact between said first rotation-transmitting protrusion and said first cam contact section, then via the contact between said first rotation-transmitting protrusion and said first cam contact section and a contact between said second rotation-transmitting protrusion and said second cam contact section, and finally via the contact between said second rotation-transmitting protrusion and said second cam contact section.

2. The lens barrel according to claim 1 further comprising:
   an anti-shake driving section which is arranged substantially symmetrically with respect to a plane containing the optical axis;
   a shutter driving section which is arranged substantially symmetrically with respect to the plane, and is located on a side of a plane which contains the optical axis and is perpendicular to the plane, substantially opposite from said anti-shake driving section; and
   a base member which holds said anti-shake driving section and said shutter driving section,
   wherein said base member includes a first through hole through which extends at least one of said first rotation-transmitting protrusion and said first cam contact section, and a second through hole through which extends at least one of said second rotation-transmitting protrusion and said second cam contact section passes, and
   wherein the first and second through holes are arranged between said anti-shake driving section and said shutter driving section, with respect a plane which is perpendicular to the optical axis.

3. An image pickup apparatus including a lens barrel, wherein said lens barrel comprises:
   a barrier drive ring that includes a first rotation-transmitting protrusion which protrudes in a direction of an optical axis toward an imaging area, and a second rotation-transmitting protrusion which is formed at a location parallel to said first rotation-transmitting protrusion and substantially opposed to said first rotation-transmitting protrusion across the optical axis; and
   an image pickup element-holding member that includes a first cam contact section and a second cam contact section which are brought into contact with said first rotation-transmitting protrusion and said second rotation-transmitting protrusion, respectively, when said lens barrel is retracted,
   wherein rotation transmission to said barrier drive ring is performed in a varying manner first via a contact between said first rotation-transmitting protrusion and said first cam contact section, then via the contact between said first rotation-transmitting protrusion and said first cam contact section and a contact between said second rotation-transmitting protrusion and said second cam contact section, and finally via the contact between said second rotation-transmitting protrusion and said second cam contact section.

* * * * *